US010589574B2

(12) United States Patent
Hayashi (10) Patent No.: US 10,589,574 B2
(45) Date of Patent: Mar. 17, 2020

(54) PNEUMATIC TIRE

(71) Applicant: BRIDGESTONE CORPORATION, Tokyo (JP)

(72) Inventor: Naohiro Hayashi, Hino (JP)

(73) Assignee: BRIDGESTONE CORPORATION, Tokyo (JP)

( * ) Notice: Subject to any disclaimer, the term of this patent is extended or adjusted under 35 U.S.C. 154(b) by 227 days.

(21) Appl. No.: 15/318,438

(22) PCT Filed: Apr. 6, 2015

(86) PCT No.: PCT/JP2015/001923
§ 371 (c)(1),
(2) Date: Dec. 13, 2016

(87) PCT Pub. No.: WO2015/194076
PCT Pub. Date: Dec. 23, 2015

(65) Prior Publication Data
US 2017/0120685 A1    May 4, 2017

(30) Foreign Application Priority Data
Jun. 16, 2014  (JP) .................. 2014-123410

(51) Int. Cl.
*B60C 11/03*        (2006.01)
*B60C 11/11*        (2006.01)
(Continued)

(52) U.S. Cl.
CPC .......... *B60C 11/0304* (2013.01); *B60C 11/01* (2013.01); *B60C 11/0306* (2013.01);
(Continued)

(58) Field of Classification Search
CPC ..... B60C 11/0306; B60C 11/11; B60C 11/01; B60C 11/0304; B60C 11/0332;
(Continued)

(56) References Cited

U.S. PATENT DOCUMENTS

2012/0298269 A1*  11/2012  Mathonet ............ B60C 11/0306
152/209.16

FOREIGN PATENT DOCUMENTS

CN      101746223 A      6/2010
EP      2 193 935 A1     6/2010
(Continued)

OTHER PUBLICATIONS

International Search Report for PCT/JP2015/001923 dated May 26, 2015 [PCT/ISA/210].
(Continued)

*Primary Examiner* — Steven D Maki
*Assistant Examiner* — Philip N Schwartz
(74) *Attorney, Agent, or Firm* — Sughrue Mion, PLLC (57) ABSTRACT

In this pneumatic tire, width direction sipes (9) on one side in the tread circumferential direction are shifted in position in a central land portion row (3a) and intermediate land portion rows (3b1, 3b2), first and second width direction grooves (4a, 4b) and the width direction sipes (9) on the one side are shifted in position in the tread circumferential direction in the central land portion row (3a), minute blocks (9a) in the central land portion row (3a) are aligned in position in the tread circumferential direction with minute blocks (9a) or third width direction grooves (4c1, 4c2) in the intermediate land portion rows (3b1, 3b2), and fifth width direction grooves (10a, 10b) and width direction shallow grooves (11a, 11b) are aligned in position in the tread circumferential direction with fourth width direction grooves (4d1, 4d2) or minute blocks (9a) in the intermediate land portion rows (3b1, 3b2).

4 Claims, 4 Drawing Sheets

(51) Int. Cl.
*B60C 11/01* (2006.01)
*B60C 11/12* (2006.01)

(52) U.S. Cl.
CPC .......... *B60C 11/0332* (2013.01); *B60C 11/11* (2013.01); *B60C 2011/0344* (2013.01); *B60C 2011/0346* (2013.01); *B60C 2011/0348* (2013.01); *B60C 2011/0362* (2013.01); *B60C 2011/0381* (2013.01); *B60C 2011/1209* (2013.01); *B60C 2200/06* (2013.01)

(58) Field of Classification Search
CPC ....... B60C 2011/0362; B60C 2011/036; B60C 2011/0381; B60C 2011/1209; B60C 2011/0348; B60C 2011/0344; B60C 2011/0346; B60C 2200/06
See application file for complete search history.

(56) References Cited

FOREIGN PATENT DOCUMENTS

| | | |
|---|---|---|
| EP | 2 390 115 A1 | 11/2011 |
| JP | 2007-126006 A | 5/2007 |
| JP | 2008-120174 A | 5/2008 |
| JP | 2011-025837 A | 2/2011 |
| JP | 4678680 B2 | 4/2011 |
| JP | 2013-001287 A | 1/2013 |
| JP | 2013-032029 A | 2/2013 |
| JP | 5388118 B2 | 1/2014 |
| WO | 2010/084848 A1 | 2/2010 |

OTHER PUBLICATIONS

Written Opinion for PCT/JP2015/001923 dated May 26, 2015 [PCT/ISA/237].

Communication dated Sep. 7, 2017, from State Intellectual Property Office of the P.R.C. in counterpart application No. 2015800324130.

* cited by examiner

PNEUMATIC TIRE

CROSS REFERENCE TO RELATED APPLICATIONS

This application is a National Stage of International Application No. PCT/JP2015/001923 filed Apr. 6, 2015, claiming priority based on Japanese Patent Application No. 2014-123410 filed Jun. 16, 2014, the contents of all of which are incorporated herein by reference in their entirety.

TECHNICAL FIELD

This disclosure relates to a pneumatic tire.

BACKGROUND

As a technique for improving on-ice and on-snow performance of a pneumatic tire, sipes are provided on the tread surface in order to ensure an edge component while suppressing a reduction in the footprint area. Upon increasing the number of sipes in order to increase the edge component, however, the block rigidity is reduced, making it impossible to achieve sufficient block durability.

To address this problem, JP 2008-120174 A (PTL 1) proposes a pneumatic tire in which circumferential sipes that divide each of the blocks forming the land portion rows of the tread surface into two small blocks are provided. Each circumferential sipe is constituted by a sipe parallel section that extends in parallel to the tread circumferential direction and a sipe inclined section that extends at an inclination to the tread circumferential direction. The sipe depth of the sipe inclined section is less than the sipe depth of the sipe parallel section.

CITATION LIST

Patent Literature

PTL 1: JP 2008-120174 A

SUMMARY

Technical Problem

In order to improve the on-ice and on-snow performance, the tread circumferential position of the edge components relative to the tread circumferential direction (the edge components due to the sipes extending in the tread width direction and the like) are preferably aligned, but in this case, the problem of pattern noise occurs, reducing the noise performance. Hence, there is still room for improvement in making the on-ice and on-snow performance compatible with noise performance in the pneumatic tire disclosed in PTL 1.

It would therefore be helpful to provide a pneumatic tire that makes on-ice and on-snow performance compatible with noise performance.

Solution to Problem

I thoroughly investigated how to solve the above problem. I focused on how the change in the shape of the step-in line of the blocks forming each land portion row on the tread surface varies from the initial stage of wear to the final stage of wear. As a result, I discovered from this perspective that the aforementioned pneumatic tire can be achieved advantageously by appropriately regulating the tread circumferential position of the width direction sipes extending in the tread width direction in each of the land portion rows, thereby completing this disclosure.

A summary of this disclosure is as follows.

A pneumatic tire according to this disclosure comprises, on a tread surface, a plurality of circumferential main grooves extending in a tread circumferential direction and a plurality of land portion rows defined by the circumferential main grooves and tread edges; wherein the land portion rows include one central land portion row positioned on a tire equatorial plane, two width direction outermost land portion rows respectively adjacent to the tread edges, and two intermediate land portion rows positioned between the central land portion row and the two width direction outermost land portion rows; in the central land portion row, a plurality of first width direction grooves are provided at intervals in the tread circumferential direction and a plurality of second width direction grooves are provided at intervals in the tread circumferential direction, each first width direction groove extending in a tread width direction, opening to a first one of the circumferential main grooves that is adjacent to the central land portion row on one side in the tread width direction, and terminating in the central land portion row, and each second width direction groove extending in the tread width direction, opening to a second one of the circumferential main grooves that is adjacent to the central land portion row on another side in the tread width direction, and terminating in the central land portion row; in each intermediate land portion row, a plurality of third width direction grooves are provided at intervals in the tread circumferential direction and a plurality of fourth width direction grooves are provided at intervals in the tread circumferential direction, each third width direction groove extending in the tread width direction, opening to the first one or the second one of the circumferential main grooves, and terminating in the intermediate land portion row, and each fourth width direction groove extending in the tread width direction, opening to one of the circumferential main grooves adjacent to one of the width direction outermost land portion rows, and terminating in the intermediate land portion row; in the central land portion row, a plurality of communication narrow grooves connecting the first width direction grooves and the second width direction grooves are provided at intervals in the tread circumferential direction, and in the intermediate land portion rows, a plurality of communication narrow grooves connecting the third width direction grooves and the fourth width direction grooves are provided at intervals in the tread circumferential direction; the central land portion row and the intermediate land portion rows are defined into a plurality of large blocks by the circumferential main grooves, the first width direction grooves, the second width direction grooves, the third width direction grooves, the fourth width direction grooves, and the communication narrow grooves, a circumferential narrow groove that extends in the tread circumferential direction and divides each large block in the tread width direction into two small blocks is formed in each large block, and at least one pair of width direction sipes extending in the tread width direction is formed in each small block; the width direction outermost land portion rows include a plurality of fifth width direction grooves extending in the tread width direction at intervals in the tread circumferential direction and at least two width direction shallow grooves extending in the tread width direction between the fifth width direction grooves; in the central land portion row and the intermediate land portion rows, one width direction sipe on one side in the tread circumferential direction in the pair of width direction sipes formed in one of the two small blocks is shifted in position in the tread circumferential direction from one width direction sipe on one side in the tread circumferential direction in the pair of width direction sipes formed in another of the two small blocks; in the central land portion row, the first width direction groove and one width direction sipe on one side in the tread circumferential direction in the pair of width direction sipes in the small block adjacent in the tread width direction to the first width direction groove are shifted in position in the tread circumferential direction, and the second width direction groove and one width direction sipe on one side in the tread circumferential direction in the pair of width direction sipes in the small block adjacent in the tread width direction to the second width direction groove are shifted in position in the tread circumferential direction; with respect to the intermediate land portion row and the small block of the central land portion row that are adjacent with the circumferential main groove therebetween, a minute block defined by the pair of width direction sipes in the small block of the central land portion row is aligned in position in the tread circumferential direction with any one of the third width direction grooves and a minute block defined by the pair of width direction sipes in the small blocks of the intermediate land portion row; and each of the fifth width direction grooves and the width direction shallow grooves in the width direction outermost land portion rows is aligned in position in the tread circumferential direction with any one of the fourth width direction grooves or the minute block defined by the pair of width direction sipes in the intermediate land portion rows.

Here, stating that width direction sipes are "shifted in position in the tread circumferential direction" refers to the positions of the edges on the one side in the tire circumferential direction of the minute blocks defined by the pair of width direction sipes being shifted 1.5 mm or more from each other in the tread circumferential direction.

Furthermore, stating that the width direction groove and width direction sipe are "shifted in position in the tread circumferential direction" refers to the position of the edge on the one side in the tire circumferential direction of the minute block defined by the pair of width direction sipes being shifted from the position of the edge on the one side in the tread circumferential direction of the large block defined by the width direction groove, the shift in position in the tread circumferential direction preferably being 1.5 mm or greater.

Stating that the minute blocks, the width direction grooves, or the width direction shallow grooves are "aligned in position in the tread circumferential direction" refers to 70% or more of a width direction projection length of one minute block, width direction groove, or width direction shallow groove with the shortest maximum length in the tread circumferential direction overlapping the width direction projection of the other minute block, width direction groove, or width direction shallow groove.

The "circumferential main grooves" refer to grooves that continuously extend approximately in the tread circumferential direction. Instead of being straight, these grooves may be zigzag-shaped, curved, or the like.

Furthermore, the "first to fifth width direction grooves" refer to grooves that extend at an inclination of 20° or less relative to the tread width direction.

The "narrow grooves" refer to grooves with a groove width (width of the opening to the tread surface) smaller than that of the circumferential main grooves.

Additionally, the "sipes" refer to grooves that have a groove width such that opposing groove wall surfaces contact each other when the tire is mounted on an applicable rim and filled to prescribed internal pressure with the maximum load applied.

In particular, the "circumferential narrow grooves" refer to sipes extending at an inclination of 15° or less relative to the tread circumferential direction, and the "width direction sipes" refer to sipes extending at an inclination of 15° or less relative to the tread width direction.

The "sipes" may take a variety of forms, such as a straight line, a zigzag-shape, or the like.

The "applicable rim" is a valid industrial standard for the region in which the tire is produced or used and refers to a standard rim of applicable size as described in the JATMA YEAR BOOK by the Japan Automobile Tyre Manufacturers Association (JATMA) in Japan, the STANDARDS MANUAL by the European Tyre and Rim Technical Organisation (ETRTO) in Europe, the YEAR BOOK by The Tire and Rim Association, Inc. (TRA) in the United States of America, and the like (Measuring Rim in the STANDARDS MANUAL by the ETRTO, and Design Rim in the YEAR BOOK by the TRA).

"Prescribed internal pressure" represents applied air pressure (the maximum air pressure) corresponding to the maximum load capability of the tire as prescribed according to tire size by the aforementioned JATMA YEAR BOOK or the like. The "maximum load" refers to the load corresponding to the aforementioned maximum load capability of the tire.

The below-described "tread circumferential direction length A1, A2 of the edge small block" refers to the average length in the tread circumferential direction of the edge small block. The "tread circumferential direction length B of the central small block" refers to the average length in the tread circumferential direction of the central small block. The average length in the tread circumferential direction of the edge small block and the central small block is calculated by dividing the area of the edge small block and the central small block by the length in the tread width direction of the edge small block and the central small block.

Advantageous Effect

According to this disclosure, a pneumatic tire that makes on-ice and on-snow performance compatible with noise performance can be provided.

DETAILED DESCRIPTION

Figure 1:
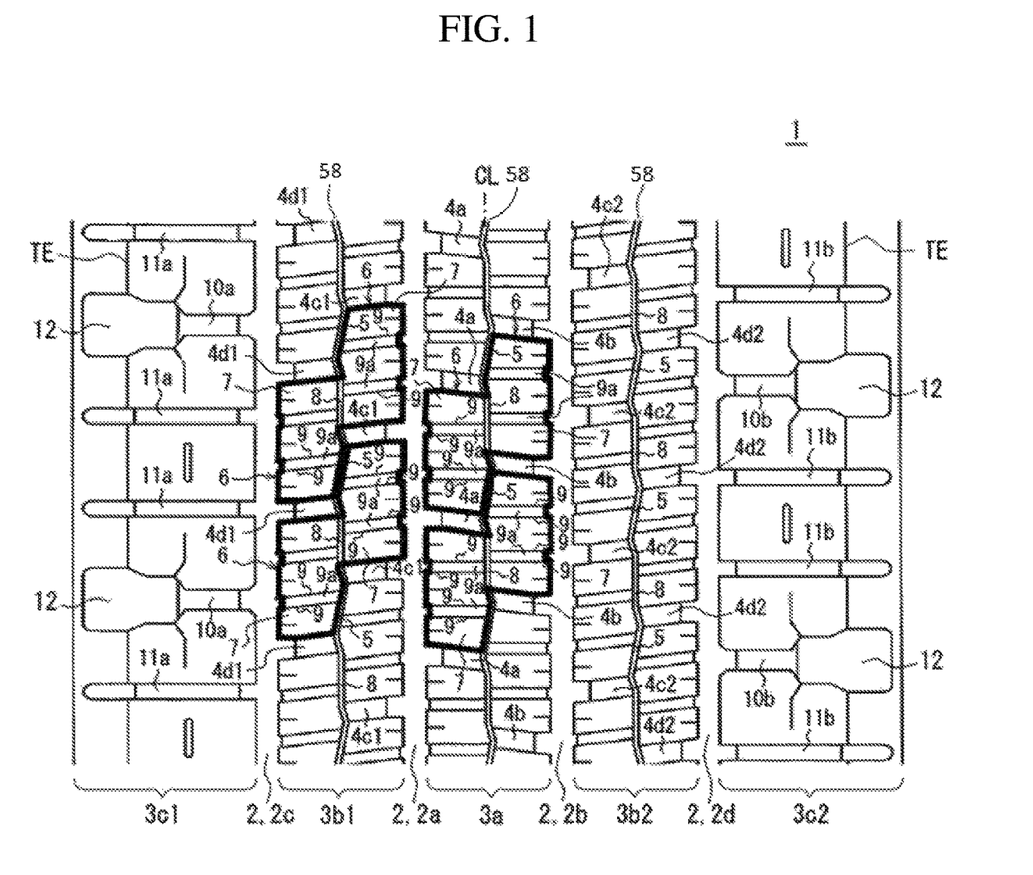
FIG. 1 is a development view illustrating a tread pattern of the pneumatic tire according to one of the disclosed embodiments.
Figure 2:
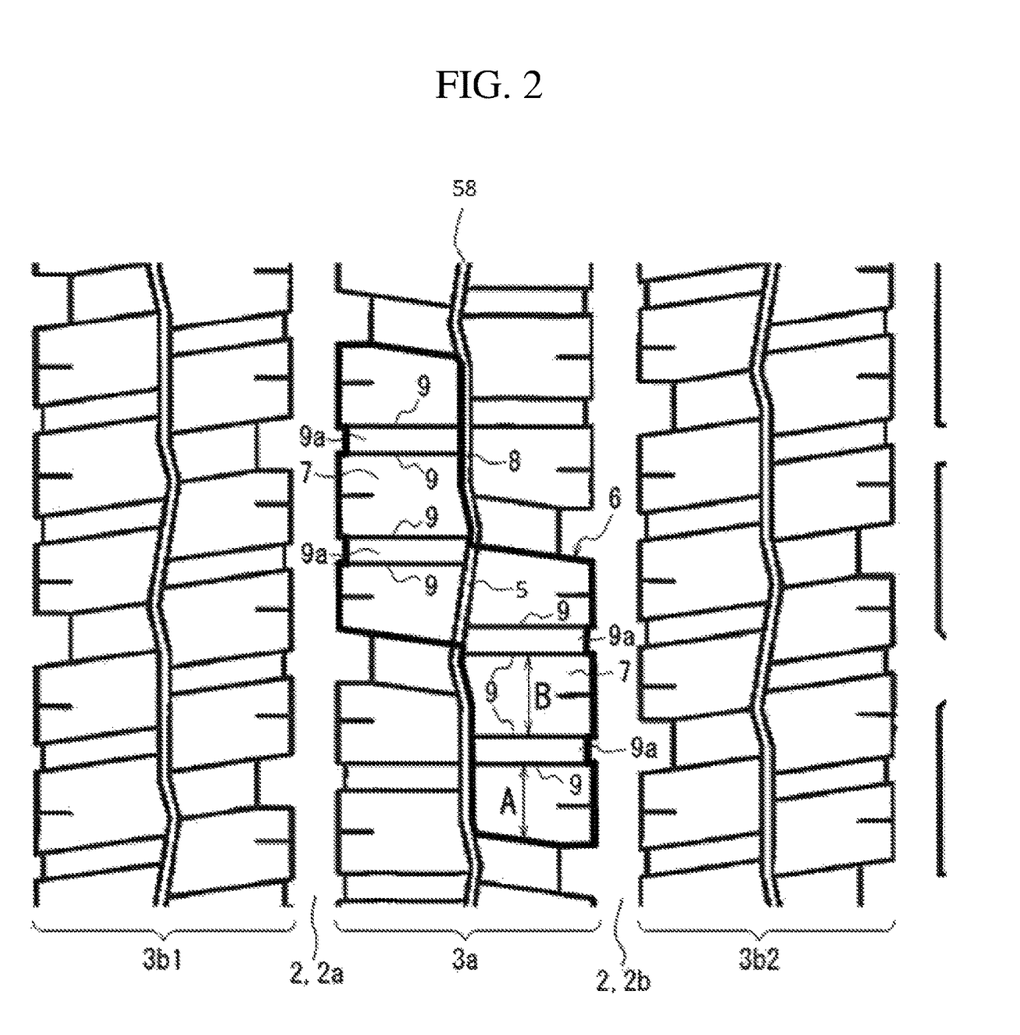
FIG. 2 is an enlargement of a portion of the central land portion row and the intermediate land portion rows in the tread pattern illustrated in FIG. 1.

The following describes embodiments of this disclosure in detail with reference to the drawings. FIG. 1 is a development view illustrating a tread pattern of the pneumatic tire (also referred to below simply as a tire) according to one embodiment, illustrating the tread surface when the tire is in a reference state of being mounted on an applicable rim and filled to prescribed internal pressure, with no load. FIG. 2 is an enlargement of a portion of the central land portion row 5 and the intermediate land portion rows in the tread pattern illustrated in FIG. 1. Furthermore, in this disclosure, the groove width, depth, angle, and the like of the grooves and sipes refer to the groove width, depth, angle, and the like in the aforementioned reference state, unless otherwise specified.

As illustrated in FIG. 1, on a tread surface 1, this tire includes a plurality of circumferential main grooves 2 (four in the illustrated example) extending in the tread circumferential direction. A plurality of land portion rows (five in the illustrated example) 3a, 3b1, 3b2, 3c1, and 3c2 are defined by the circumferential main grooves 2 and tread edges TE.

As illustrated in FIG. 1, this tire includes, on the tread surface 1, one central land portion row 3a positioned on the tire equatorial plane CL, two width direction outermost land portion rows 3c1 and 3c2 adjacent to respective tread edges TE, and two intermediate land portion rows 3b1 and 3b2 respectively positioned between the central land portion row 3a and the two width direction outermost land portion rows 3c1 and 3c2. In the illustrated example, the central land portion row 3a is defined by a first circumferential main groove 2a adjacent on one side in the tread width direction and a second circumferential main groove 2b adjacent on the other side in the tread width direction. The intermediate land portion row 3b1 is defined by the first circumferential main groove 2a and a circumferential main groove 2c furthest outward in the tread width direction (positioned in the tread width direction half portion that is on the same side as the first circumferential main groove 2a). Similarly, the intermediate land portion row 3b2 is defined by the second circumferential main groove 2b and a circumferential main groove 2d furthest outward in the tread width direction (positioned in the tread width direction half portion that is on the same side as the second circumferential main groove 2b). Furthermore, the width direction outermost land portion row 3c1 is defined by the circumferential main groove 2c furthest outward in the tread width direction and the tread edge TE, and similarly, the width direction outermost land portion row 3c2 is defined by the circumferential main groove 2d furthest outward in the tread width direction and the tread edge TE.

Here, as illustrated in FIG. 1, a plurality of first width direction grooves 4a (four in the illustrated range) extending in the tread width direction are provided in the central land portion row 3a at intervals in the tread circumferential direction. The width direction grooves 4a open to the first circumferential main groove 2a that is adjacent to the central land portion row 3a on one side in the tread width direction and terminate in the central land portion row 3a.

As illustrated in FIG. 1, a plurality of second width direction grooves 4b (four in the illustrated range) extending in the tread width direction are also provided in the central land portion row 3a at intervals in the tread circumferential direction. The width direction grooves 4b open to the second circumferential main groove 2b that is adjacent to the central land portion row 3a on the other side in the tread width direction and terminate in the central land portion row 3a.

As illustrated in FIG. 1, the first width direction grooves 4a and the second width direction grooves 4b are shifted in position in the tread circumferential direction.

In order to make drainage performance compatible with the rigidity of the land portion rows, the circumferential main grooves 2a to 2d preferably have a groove width (width of the opening to the tread surface 1) of 6 mm to 10 mm and a groove depth (maximum depth) of 13.5 mm to 17.5 mm.

Also, in order to make drainage performance compatible with block rigidity, the first width direction grooves 4a and the second width direction grooves 4b preferably have a groove width (opening width) of 6 mm to 10 mm and a groove depth (maximum depth) of 7 mm to 12 mm.

Furthermore, the pitch, in the tread circumferential direction, of the first width direction grooves 4a adjacent in the tread circumferential direction is preferably 40 mm to 60 mm. Similarly, the pitch, in the tread circumferential direction, of the second width direction grooves 4b adjacent in the tread circumferential direction is preferably 40 mm to 60 mm.

Also, the interval in the tread circumferential direction (smallest interval) between the first width direction grooves 4a and the second width direction grooves 4b that are adjacent in the tread circumferential direction is preferably 15 mm to 30 mm.

As illustrated in FIG. 1, a plurality of third width direction grooves 4c1 and 4c2 (four each in the illustrated range) extending in the tread width direction are also provided in the intermediate land portion rows 3b1 and 3b2 at intervals in the tread circumferential direction. The third width direction grooves 4c1 and 4c2 open to the first circumferential main groove 2a and the second circumferential main groove 2b and terminate in the intermediate land portion rows 3b1 and 3b2.

Furthermore, as illustrated in FIG. 1, a plurality of fourth width direction grooves 4d1 and 4d2 (four each in the illustrated range) extending in the tread width direction are also provided in the intermediate land portion rows 3b1 and 3b2 at intervals in the tread circumferential direction. The fourth width direction grooves 4d1 and 4d2 respectively open to the circumferential main grooves 2c and 2d, which are furthest outward in the width direction and adjacent to the width direction outermost land portion rows 3c1 and 3c2, and terminate in the intermediate land portion rows 3b1 and 3b2.

In order to make drainage performance compatible with block rigidity, the third width direction grooves 4c1 and 4c2 preferably have a groove width (opening width) of 6 mm to 10 mm and a groove depth (maximum depth) of 7 mm to 12 mm.

Also, in order to make drainage performance compatible with block rigidity, the fourth width direction grooves 4d1 and 4d2 preferably have a groove width (opening width) of 6 mm to 10 mm and a groove depth (maximum depth) of 7 mm to 12 mm.

Furthermore, the pitch, in the tread circumferential direction, of the third width direction grooves 4c1 and 4c2 adjacent in the tread circumferential direction is preferably 40 mm to 60 mm. Similarly, the pitch, in the tread circumferential direction, of the fourth width direction grooves 4d1 and 4d2 adjacent in the tread circumferential direction is preferably 40 mm to 60 mm.

Also, the interval in the tread circumferential direction (smallest interval) between the fourth width direction grooves 4c1 (4c2) and the fourth width direction grooves 4d1 (4d2) that are adjacent in the tread circumferential direction is preferably 15 mm to 30 mm.

Furthermore, as illustrated in FIG. 1, in each of the central land portion row 3a and the intermediate land portion rows 3b1 and 3b2, a block circumferential groove 58 including a plurality of communication narrow groove portions 5 connecting the first width direction grooves 4a and the second width direction grooves 4b are provided in the central land portion row 3a at intervals in the tread circumferential direction. Similarly, a plurality of communication narrow groove portions 5 connecting the third width direction grooves 4c1 and the fourth width direction grooves 4d1 (or the third width direction grooves 4c2 and the fourth width direction grooves 4d2) are provided in the intermediate land portion rows 3b1 and 3b2 as well at intervals in the tread circumferential direction.

The groove width of the communication narrow groove portions 5 is preferably 0.7 mm to 2 mm, and the sipe depth (maximum depth) is preferably 8 mm to 13 mm.

As illustrated in FIGS. 1 and 2, the central land portion row 3a and the intermediate land portion rows 3b1 and 3b2 are defined into a plurality of large blocks 6 (in FIG. 1 and FIG. 2, a portion of the large blocks 6 is outlined in bold) by the circumferential main grooves 2a and 2b, the first width direction grooves 4a, the second width direction grooves 4b, the third width direction grooves 4c1 and 4c2, the fourth width direction grooves 4d1 and 4d2, the communication narrow groove portions 5 and a circumferential narrow groove portion 8 of the block circumferential groove 58 that extends in the tread circumferential direction and divides each large block 6 in the tread width direction into two small blocks 7. At least one pair (two pairs in the illustrated example) of width direction sipes 9 extending in the tread width direction is formed in each small block 7.

The groove width of the circumferential narrow groove portion 8 is preferably 0.7 mm to 1.2 mm, and the sipe depth (maximum depth) is preferably 8 mm to 13 mm. The groove width of the width direction sipes 9 is preferably 0.7 mm to 1.2 mm, and the sipe depth (maximum depth) is preferably 8 mm to 13 mm. Furthermore, the tread circumferential direction interval between the width direction sipes 9 in each pair is preferably 3 mm to 5 mm.

Here, as illustrated in FIG. 1, the width direction outermost land portion rows 3c1 and 3c2 include a plurality of fifth width direction grooves (two in the illustrated range) 10a, 10b extending in the tread width direction at intervals in the tread circumferential direction and at least two width direction shallow grooves (two in the illustrated example) 11a and 11b extending in the tread width direction between the fifth width direction grooves 10a and 10b.

In order to make drainage performance compatible with block rigidity, the fifth width direction grooves 10a and 10b preferably have a groove width (opening width) of 6 mm to 10 mm and a groove depth (maximum depth) of 7 mm to 12 mm. Also, the interval in the tread circumferential direction between the width direction grooves 10a (10b) that are adjacent in the tread circumferential direction is preferably 80 mm to 120 mm.

In order to make drainage performance compatible with block rigidity, the width direction shallow grooves 11a and 11b preferably have a groove width (opening width) of 4.5 mm to 7.5 mm and a groove depth (maximum depth) of 5 mm to 12 mm. Also, the interval in the tread circumferential direction between the width direction shallow grooves 11a (11b) that are adjacent in the tread circumferential direction is preferably 20 mm to 40 mm.

The tire of this embodiment has the following features. As illustrated in FIGS. 1 and 2, in the central land portion row 3a and the intermediate land portion rows 3b1 and 3b2, one width direction sipe 9 on one side in the tread circumferential direction in the pair of width direction sipes 9 formed in one of the two small blocks 7 is shifted in position in the tread circumferential direction from one width direction sipe 9 on one side in the tread circumferential direction in the pair of width direction sipes 9 formed in the other of the two small blocks 7.

In other words, the position in the tread circumferential direction of the edge of a minute block 9a defined by the width direction sipe 9 at one side in the tread circumferential direction in the pair of width direction sipes 9 differs between the two small blocks 7.

As illustrated in FIG. 1, in the central land portion row 3a, the first width direction groove 4a and one width direction sipe 9 on one side in the tread circumferential direction in the pair of width direction sipes 9 in the small block 7 adjacent in the tread width direction to the first width direction groove 4a are shifted in position in the tread circumferential direction, and the second width direction groove 4b and one width direction sipe 9 on one side in the tread circumferential direction in the pair of width direction sipes 9 in the small block 7 adjacent in the tread width direction to the second width direction groove 4b are shifted in position in the tread circumferential direction.

In other words, in the central land portion row 3a, as illustrated in FIG. 1, the edge at one side in the tread circumferential direction of each large block 6 defined by the first and second width direction grooves 4a and 4b and the edge of the minute block 9a defined by the width direction sipe 9 at one side in the tread circumferential direction in the pair of width direction sipes 9 are shifted in the tread circumferential direction.

In the illustrated example, the intermediate land portion rows 3b1 and 3b2 also have a similar structure.

Furthermore, in one half portion in the tread width direction of the tire of this embodiment, with respect to the small block 7 of the central land portion row 3a and the intermediate land portion row 3b1 that are adjacent with the circumferential main groove 2a therebetween, a minute block 9a defined by the pair of width direction sipes 9 in the small block 7 of the central land portion row 3a is aligned in position in the tread circumferential direction with any one of the third width direction grooves 4c1 and the minute block 9a defined by the pair of width direction sipes 9 in the small blocks 7 of the intermediate land portion row 3b1. Similarly, in the other half portion in the tread width direction, with respect to the small block 7 of the central land portion row 3a and the intermediate land portion row 3b2 that are adjacent with the circumferential main groove 2b therebetween, a minute block 9a defined by the pair of width direction sipes 9 in the small block 7 of the central land portion row 3a is aligned in position in the tread circumferential direction with any one of the third width direction grooves 4c2 and the minute block 9a defined by the pair of width direction sipes 9 in the small blocks 7 of the intermediate land portion row 3b2.

In one half portion in the tread width direction, each of the fifth width direction grooves 10a and the width direction shallow grooves 11a in the width direction outermost land portion row 3d1 is aligned in position in the tread circumferential direction with any one of the fourth width direction grooves 4d1 or the minute block 9a defined by the pair of width direction sipes 9 in the intermediate land portion row 3b1. Similarly, in the other half portion in the tread width direction, each of the fifth width direction grooves 10b and the width direction shallow grooves 11b in the width direction outermost land portion row 3d2 is aligned in position in the tread circumferential direction with any one of the fourth width direction grooves 4d2 or the minute block 9a defined by the pair of width direction sipes 9 in the intermediate land portion row 3b2.

The following describes the effects of the pneumatic tire according to this embodiment.

According to the tire of this embodiment, as described above, in the central land portion row 3a and the intermediate land portion rows 3b1 and 3b2, one width direction sipe 9 on one side in the tread circumferential direction in the pair of width direction sipes 9 formed in one of the two small blocks 7 is shifted in position in the tread circumferential direction from one width direction sipe 9 on one side in the tread circumferential direction in the pair of width direction sipes 9 formed in the other of the two small blocks 7.

The small blocks 7 adjacent in the tread width direction are defined not by the main groove but rather by the circumferential narrow groove 8. Therefore, the two small blocks 7 adjacent in the tread width direction are close to each other. Accordingly, the two width direction sipes 9 that are at a narrow interval, which tends to increase noise, are shifted in position in the tread circumferential direction, allowing the occurrence of pattern noise to be effectively suppressed and improving the noise performance. In particular, when the tire is mounted on the vehicle so that the aforementioned "one side in the tread circumferential direction" is the leading edge side, the pattern noise can be suppressed even more effectively.

According to the tire of this embodiment, as described above, in the central land portion row 3a, the first width direction groove 4a and one width direction sipe 9 on one side in the tread circumferential direction in the pair of width direction sipes 9 in the small block 7 adjacent in the tread width direction to the first width direction groove 4a are shifted in position in the tread circumferential direction, and the second width direction groove 4b and one width direction sipe 9 on one side in the tread circumferential direction in the pair of width direction sipes 9 in the small block 7 adjacent in the tread width direction to the second width direction groove 4b are shifted in position in the tread circumferential direction.

Figure 3A:
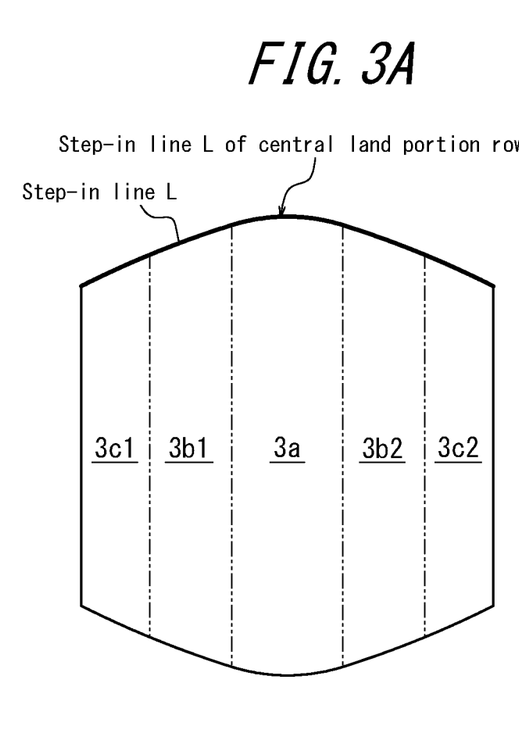
FIG. 3A illustrates the footprint and the step-in line at the initial stage of wear.
Figure 3B:
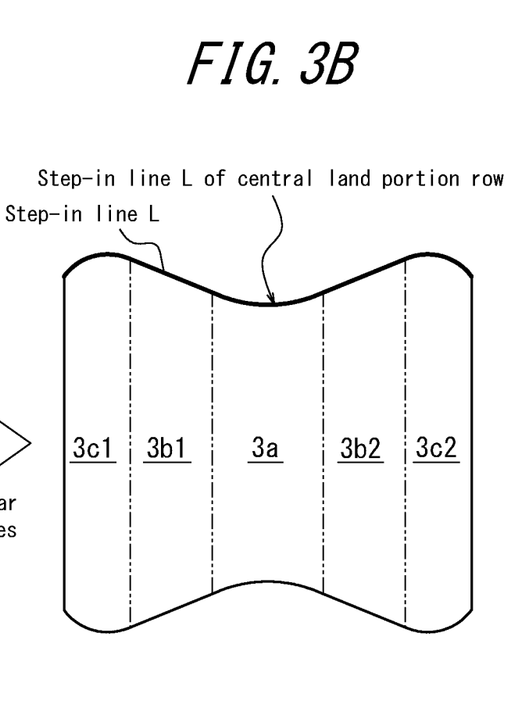
FIG. 3B illustrates the footprint and the step-in line at the final stage of wear.

FIG. 3A illustrates the footprint of the tire at the initial stage of wear, and FIG. 3B illustrates the footprint of the tire at the final stage of wear.

As illustrated in FIGS. 3A and 3B, in the central land portion row 3a positioned on the tire equatorial plane CL, the inclination angle of the step-in line L relative to the tire width direction is smaller from the initial stage of wear (FIG. 3A) to the final stage of wear (FIG. 3B).

Accordingly, in the central land portion row 3a, the step-in timing is the same for the first width direction groove 4a (second width direction groove 4b) and the width direction sipe 9 adjacent thereto in the tread width direction. Hence, by shifting the position in the tread circumferential direction of the width direction groove 4a (4b) and the width direction sipe 9 in the central land portion row, the occurrence of pattern noise can be effectively suppressed, thereby improving the noise performance. In particular, when the tire is mounted on the vehicle so that the aforementioned "one side in the tread circumferential direction" is the leading edge side, the pattern noise can be suppressed even more effectively.

Furthermore, in the tire of this embodiment, as described above, with respect to the small block 7 of the central land portion row 3a and the intermediate land portion row 3b1 (3b2) that are adjacent with the circumferential main groove 2a (2b) therebetween, a minute block 9a defined by the pair of width direction sipes 9 in the small block 7 of the central land portion row 3a is aligned in position in the tread circumferential direction with any one of the third width direction grooves 4c1 (4c2) and the minute block 9a defined by the pair of width direction sipes 9 in the small blocks 7 of the intermediate land portion row 3b1 (3b2).

As illustrated in FIGS. 3A and 3B, in the intermediate land portion rows 3b1 and 3b2, the inclination angle of the step-in line L relative to the tire width direction is relatively large from the initial stage of wear (FIG. 3A) to the final stage of wear (FIG. 3B) as compared to the central land portion row 3a.

Furthermore, the small blocks 7 of the central land portion row 3a are separated from the intermediate land portion rows 3b1 (3b2) by the circumferential main groove 2a (2b). Therefore, the distance therebetween in the tread width direction is also large.

Accordingly, adopting the aforementioned structure has nearly no adverse effect on noise performance. On the other hand, by aligning the position in the tread circumferential direction of the width direction sipes 9 and the third width direction grooves 4c1 (4c2), a large edge component can be guaranteed, improving the on-ice and on-snow performance of the tire.

Additionally, according to the tire of this embodiment, as described above, each of the fifth width direction grooves 10a (10b) and the width direction shallow grooves 11a (11b) disposed in the width direction outermost land portion row 3c1 (3c2) is aligned in position in the tread circumferential direction with any one of the fourth width direction grooves 4d1 (4d2) or the minute block 9a defined by the pair of width direction sipes 9 in the intermediate land portion row 3b1 (3b2).

As illustrated in FIGS. 3A and 3B, in the width direction outermost land portion rows 3c1 and 3c2, the inclination angle of the step-in line L relative to the tire width direction is relatively large from the initial stage of wear (FIG. 3A) to the final stage of wear (FIG. 3B) as compared to the central land portion row 3a.

Furthermore, the width direction outermost land portion rows 3c1 (3c2) are separated from the intermediate land portion rows 3b1 (3b2) by the circumferential main groove 2c (2d). Therefore, the distance therebetween in the tread width direction is also large.

Accordingly, adopting the aforementioned structure has nearly no adverse effect on noise performance. On the other hand, by aligning the position in the tread circumferential direction of the width direction sipes 9 and the fourth width direction grooves 4d1 (4d2), a large edge component can be guaranteed, improving the on-ice and on-snow performance of the tire.

As described above, with the tire of this embodiment, the on-ice and on-snow performance can be made compatible with noise performance from the initial stage of wear to the final stage of wear.

In this disclosure, each small block 7 preferably includes two pairs of width direction sipes 9, as illustrated in FIG. 1. The reason is that the on-ice and on-snow performance can be guaranteed ever further.

In this disclosure, the ratio B/A1 is preferably 0.8 to 1.3 and the ratio B/A2 is preferably 0.8 to 1.3, where the small block 7 is divided by the two pairs of width direction sipes 9 so that A1 and A2 in millimeters are the tread circumferential length of two edge small blocks positioned at tread circumferential edges (in FIG. 2, only the tread circumferential direction distance of one edge block is representatively shown as "A"), and B in millimeters is the tread circumferential length of a central small block positioned between the two edge small blocks.

The reason is that by the ratio B/A1 and the ratio B/A2 being 0.8 or greater, the rigidity of the central small block can be guaranteed, whereas by the ratio B/A1 and the ratio B/A2 being 1.3 or less, the rigidity of the edge small blocks can be guaranteed. Therefore, with the aforementioned ranges, the rigidity balance of the small block 7 can be achieved. In particular, when the sipe depth of the width direction sipes 9 is greater than or equivalent to the groove depth of the first and second width direction grooves 4a and 4b, the ratio B/A1 and the ratio B/A2 are preferably 1.0 to 1.3, whereas when the sipe depth of the width direction sipes 9 is less than or equivalent to the groove depth of the first and second width direction grooves 4a and 4b, the ratio B/A1 and the ratio B/A2 are preferably 0.8 to 1.0.

Furthermore, in this disclosure, voids 12 are preferably formed in the width direction outermost land portion rows 3c1 and 3c2, as illustrated in FIG. 1. The reason is that the snow drainage performance in the width direction outermost land portion rows 3c1 and 3c2 can be improved. The depth of the voids 12 is preferably 10 mm to 16 mm. As in the drawings, the voids 12 are preferably provided so as to communicate with the fifth width direction grooves 10a and 10b.

Examples

Figure 4:
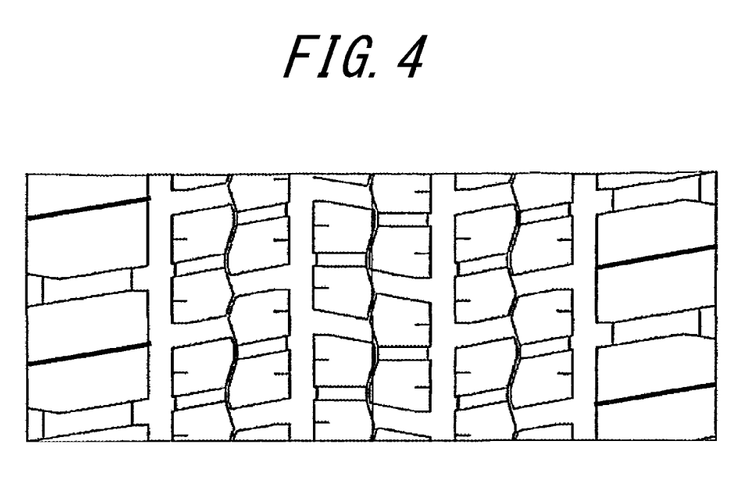
FIG. 4 is a developed view of the tread pattern of a tire according to Comparative Example 1.

In order to confirm the effects of this disclosure, the following tires were produced: a tire according to Example 2 having the tread pattern illustrated in FIG. 1; a tire according to Example 1 that differs from Example 2 only by not having voids; a tire according to Comparative Example 1, that, as illustrated in FIG. 4, has only one pair of width direction sipes between width direction grooves in the tread circumferential direction in the central land portion row and the intermediate land portion rows, such that in the central land portion row, the first width direction groove and one width direction sipe on one side in the tread circumferential direction in the pair of width direction sipes in the small block adjacent in the tread width direction to the first width direction groove are shifted in position in the tread circumferential direction, the second width direction groove and one width direction sipe on one side in the tread circumferential direction in the pair of width direction sipes in the small block adjacent in the tread width direction to the second width direction groove are shifted in position in the tread circumferential direction, and a minute block defined by the pair of width direction sipes in the small block of the central land portion row is not aligned in position in the tread circumferential direction with any of the third width direction grooves and a minute block defined by the pair of width direction sipes in the small blocks of the intermediate land portion row; and a tire according to Comparative Example 2 in which, in the central land portion row and the intermediate land portion rows, one width direction sipe on one side in the tread circumferential direction in the pair of width direction sipes formed in one of the two small blocks is not shifted in position in the tread circumferential direction from one width direction sipe on one side in the tread circumferential direction in the pair of width direction sipes formed in the other of the two small blocks, and in the central land portion row, the first width direction groove and one width direction sipe on one side in the tread circumferential direction in the pair of width direction sipes in the small block adjacent in the tread width direction to the first width direction groove are not shifted in position in the tread circumferential direction, and the second width direction groove and one width direction sipe on one side in the tread circumferential direction in the pair of width direction sipes in the small block adjacent in the tread width direction to the second width direction groove are not shifted in position in the tread circumferential direction. To evaluate the performance of each tire, the following tests were conducted.

<On-Ice Performance>

The aforementioned tires with a tire size of 11R22.5 were mounted on a vehicle, and with the vehicle empty, the accelerator was fully depressed starting at 5 km/h. The on-ice performance was calculated based on the time to travel 20 m. The evaluation is expressed as an index, with Comparative Example 1 being 100. A larger value indicates better on-ice performance.

<On-Snow Performance>

The aforementioned tires with a tire size of 11R22.5 were mounted on a vehicle, and with the vehicle loaded, the braking distance at 20 km/h was evaluated. The evaluation is expressed as an index, with Comparative Example 1 being 100. A larger value indicates better on-snow performance.

<Noise Performance>

The aforementioned tires with a tire size of 11R22.5 were mounted on a vehicle, and noise performance was evaluated based on in-room noise measurement when actually driving. The evaluation is expressed as an index, with Comparative Example 1 being 100. A larger value indicates better noise performance.

Table 1 below lists the evaluation results.

TABLE 1

|  | Example 1 | Example 2 | Comparative Example 1 | Comparative Example 2 |
| --- | --- | --- | --- | --- |
| FIG. | — | FIG. 1 | FIG. 4 | — |
| On-Ice Performance | 103 | 103 | 100 | 103 |
| On-Snow Performance | 103 | 105 | 100 | 103 |
| Noise Performance | 100 | 100 | 100 | 95 |
| Overall Evaluation | good | excellent | fair | fair |

As shown by Table 1, the tires according to Examples 1 and 2 can both make on-ice and on-snow performance more compatible with noise performance than the tires according to Comparative Examples 1 and 2. In particular, it is clear that the tire according to Example 2, in which voids were provided in the width direction outermost land portions, has even better on-snow performance than Example 1.

INDUSTRIAL APPLICABILITY

According to this disclosure, a pneumatic tire that makes on-ice and on-snow performance compatible with noise performance can be provided. This disclosure is particularly appropriate for heavy-duty tires, such as tires for trucks or buses.

REFERENCE SIGNS LIST

1 Tread surface
2 Circumferential main groove
3 Land portion row
3a Central land portion row
3b1, 3b2 Intermediate land portion row
3c1, 3c2 Width direction outermost land portion row
4a First width direction groove
4b Second width direction groove
4c1, 4c2 Third width direction groove
4d1, 4d2 Fourth width direction groove
5 Communication narrow groove 58 Block circumferential Groove
6 Large block
7 Small block
8 Circumferential narrow groove
9 Width direction sipe
9a Minute block
10a, 10b Fifth width direction groove
11a, 11b Width direction shallow groove
12 Void
L Step-in line
CL Tire equatorial plane
TE Tread edge

The invention claimed is:

1. A pneumatic tire comprising:
on a tread surface, a plurality of circumferential main grooves extending in a tread circumferential direction and a plurality of land portion rows defined by the circumferential main grooves and tread edges; wherein
the land portion rows include one central land portion row positioned on a tire equatorial plane, two width direction outermost land portion rows respectively adjacent to the tread edges, and two intermediate land portion rows positioned between the central land portion row and the two width direction outermost land portion rows;
in the central land portion row, a plurality of first width direction grooves are provided at intervals in the tread circumferential direction and a plurality of second width direction grooves are provided at intervals in the tread circumferential direction, each first width direction groove extending in a tread width direction, opening to a first one of the circumferential main grooves that is adjacent to the central land portion row on one side in the tread width direction, and terminating in the central land portion row, and each second width direction groove extending in the tread width direction, opening to a second one of the circumferential main grooves that is adjacent to the central land portion row on another side in the tread width direction, and terminating in the central land portion row;
in each intermediate land portion row, a plurality of third width direction grooves are provided at intervals in the tread circumferential direction and a plurality of fourth width direction grooves are provided at intervals in the tread circumferential direction, each third width direction groove extending in the tread width direction, opening to the first one or the second one of the circumferential main grooves, and terminating in the intermediate land portion row, and each fourth width direction groove extending in the tread width direction, opening to one of the circumferential main grooves adjacent to one of the width direction outermost land portion rows, and terminating in the intermediate land portion row;
in the central land portion row and in each intermediate land portion row, a block circumferential groove extending in the tread circumferential direction is formed,
in the central land portion row, a plurality of communication narrow groove portions of the block circumferential groove connecting the first width direction grooves and the second width direction grooves are provided at intervals in the tread circumferential direction, and in the intermediate land portion rows, a plurality of communication narrow groove portions of the block circumferential groove connecting the third width direction grooves and the fourth width direction grooves are provided at intervals in the tread circumferential direction;
the central land portion row and the intermediate land portion rows are defined into a plurality of large blocks by the circumferential main grooves, the first width direction grooves, the second width direction grooves, the third width direction grooves, the fourth width direction grooves, and the communication narrow groove portions, a circumferential narrow groove portion of the circumferential narrow groove that extends in the tread circumferential direction and divides each large block in the tread width direction into two small blocks is formed in each large block, and at least one pair of width direction sipes extending in the tread width direction is formed in each small block;
the width direction outermost land portion rows include a plurality of fifth width direction grooves extending in the tread width direction at intervals in the tread circumferential direction and at least two width direction shallow grooves extending in the tread width direction between the fifth width direction grooves;
in the central land portion row and the intermediate land portion rows, one width direction sipe on one side in the tread circumferential direction in the pair of width direction sipes formed in one of the two small blocks is shifted in position in the tread circumferential direction from one width direction sipe on one side in the tread circumferential direction in the pair of width direction sipes formed in another of the two small blocks;
in the central land portion row, the first width direction groove and one width direction sipe on one side in the tread circumferential direction in the pair of width direction sipes in the small block adjacent in the tread width direction to the first width direction groove are shifted in position in the tread circumferential direction, and the second width direction groove and one width direction sipe on one side in the tread circumferential direction in the pair of width direction sipes in the small block adjacent in the tread width direction to the second width direction groove are shifted in position in the tread circumferential direction;
with respect to the intermediate land portion row and the small block of the central land portion row that are adjacent with the circumferential main groove therebetween, a minute block defined by the pair of width direction sipes in the small block of the central land portion row is aligned in position in the tread circumferential direction with any one of the third width direction grooves and a minute block defined by the pair of width direction sipes in the small blocks of the intermediate land portion row; and
each of the fifth width direction grooves and the width direction shallow grooves in the width direction outermost land portion rows is aligned in position in the tread circumferential direction with any one of the fourth width direction grooves or the minute block defined by the pair of width direction sipes in the intermediate land portion rows,
one of two width direction shallow grooves adjacent to each other in the tread circumferential direction is aligned in a position in the tread circumferential direction with the fourth width direction grooves and the other is aligned in position in the tread circumferential direction with the minute block defined by the pair of width direction sipes.

2. The pneumatic tire of claim 1, wherein each small block includes two pairs of the width direction sipes.

3. The pneumatic tire of claim 2, wherein a ratio B/A1 is 0.8 to 1.3 and a ratio B/A2 is 0.8 to 1.3, where the small block is divided by the two pairs of width direction sipes so that A1 and A2 in millimeters are a tread circumferential length of two edge small blocks positioned at tread circumferential edges, and B in millimeters is a tread circumferential length of a central small block positioned between the two edge small blocks.

4. The pneumatic tire of claim 1, wherein a void is formed in the width direction outermost land portion rows.

\* \* \* \* \*